W. L. Gilroy.
Implement for Cutting Green Corn.
N°. 90,522.      Patented May 25, 1869.
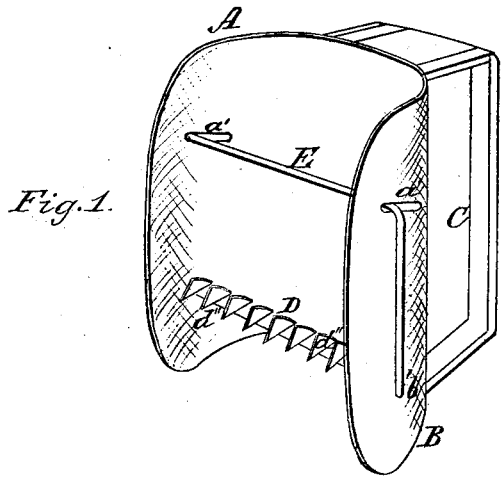
Fig. 1.
Fig. 2.
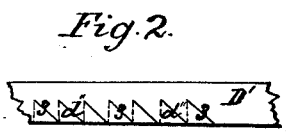
Witnesses.
Benj. Morrison
R. D. Pennock
Inventor.
Wm. L. Gilroy

UNITED STATES PATENT OFFICE.

WASHINGTON L. GILROY, OF PHILADELPHIA, PENNSYLVANIA.

IMPROVED IMPLEMENT FOR CUTTING GREEN CORN FROM THE COB.

Specification forming part of Letters Patent No. 90,522, dated May 25, 1869.

*To all whom it may concern:*

Be it known that I, WASHINGTON L. GILROY, of the city of Philadelphia, in the State of Pennsylvania, have invented a new and useful Implement for More Rapidly Removing the Grains of Green Corn from their Skins and Cob; and I do hereby declare that the following is a full, clear, and exact description of the construction and operation of the same, reference being had to the accompanying drawings, in which—

Figure 1 is a perspective view of the said implement, and Fig. 2 a sectional plan view of a sheet-metal plate, showing the manner in which the series of cutters is produced in one piece.

Like letters and numbers of reference indicate the same parts when in both figures.

The object of this invention is to afford a simple and strong implement, whereby the pulpy or soft grains of green corn can be removed from their skins and cob in the rapid manner required in the kitchen and in establishments for putting up the same for future sale and use.

The nature of my invention consists of a series of stationary cutters and a springy bar, secured across the concave side of a sheet-metal shell, provided with a suitable handle on its outer or convex side, substantially as hereinafter described.

Referring to the drawings, A B is the shell; C, the handle; D, the series of cutters; and E, the springy bar.

The shell A B is an oval plate of sheet metal, bent into the form of an arch, and has the handle C attached, so as to project, like the handle of a jug, along the middle of the convex or outer side of the shell A B, as shown in Fig. 1.

Through each of the two opposite sides of the shell A B a slightly-curved slot, $a'$, is made, near its upper end, for the purpose of receiving across the concave side of the implement and allowing the requisite springy motion to the bar E, the ends of which latter project downward and are fastened rigidly to the outside of the said shell at $b'$.

The series D of cutters consists of a number of cutting-plates, $d'$, projecting outward from a bar or narrow plate of metal, which is fixed across near the lower end of the concave side of the implement. The said cutters $d'$ are arranged side by side, at about a quarter of an inch apart, more or less parallel to each other and to the two projecting sides of the implement, as represented in Fig. 1.

The manner in which the cutters are formed is indicated in Fig. 2, D′ being a narrow strip of sheet metal of uniform width, having in one of its edges a regular series of oblique cuts, 3 3, made parallel to each other and at the distance apart required. The sharp-pointed parts between the cuts 3 are afterward bent upward, so as to be at right angles to the face side of the strip D′, the lines of the bends being at right angles to the edge of the said strip, as indicated by the dotted lines, thus producing the series of the sharp angular cutters $d''$, as represented in Fig. 1.

Operation.

The implement is intended to be held by its handle C in one hand, and in a position with its series of cutters D below the bar E, substantially as represented in Fig. 1, and the ear of corn being held at rest in an inclined position, the implement is to be then drawn firmly downward over the whole length of the ear of corn, with the cutters $d''$ and the bar E in contact therewith, so as to cause the said cutters to cut through the skins of the grains and the springy bar E to force the inclosed grains out from their skins and cob, and so, in repetition, around the ear.

Having already invented and introduced into public use a knife and a fork for table use in removing the green grains of corn from the cob, the present implement is intended to complete a series, by affording a ready means of doing the same thing in a large way, as is required by those who make a business or specialty of putting up fruit and vegetables for future sale and use, and at the same time to afford a more rapid means of preparing green corn for the table without the cob, as required, in the kitchen.

The implement is simple of construction, not liable to get out of order by use, and is entirely effective for the purpose.

I wish it to be understood that I do not desire nor intend to confine the form or dimensions of the implement, nor the shape of the cutters $d''$, to those shown and described; but Having fully described my invention and pointed out its utility, what I claim as new, and desire to secure by Letters Patent, is confined to the following, viz:

I claim an implement consisting of the shell A B, provided with a series of cutters, D, and a springy bar, E, constructed and combined together, substantially as and for the purpose described.

WASH. L. GILROY.

Witnesses:
 BENJ. MORISON,
 W. W. DOUGHERTY.